Jan. 28, 1958 — W. E. BLADH — 2,821,319
NOVELTY BOTTLE CAP
Filed May 16, 1955 — 2 Sheets-Sheet 1
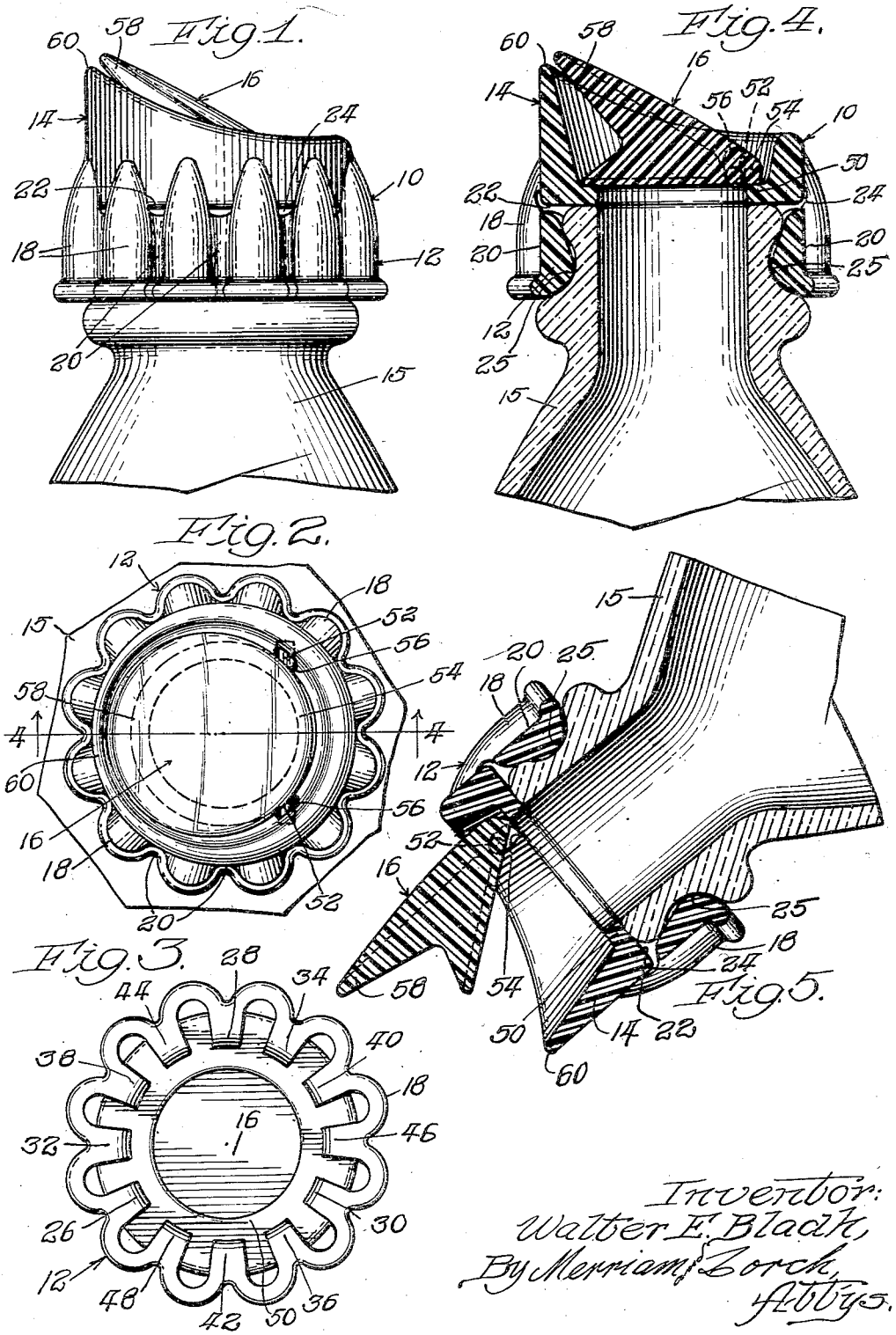
Inventor:
Walter E. Bladh,
By Merriam & Zorch,
Attys.

Jan. 28, 1958 W. E. BLADH 2,821,319
NOVELTY BOTTLE CAP
Filed May 16, 1955 2 Sheets-Sheet 2
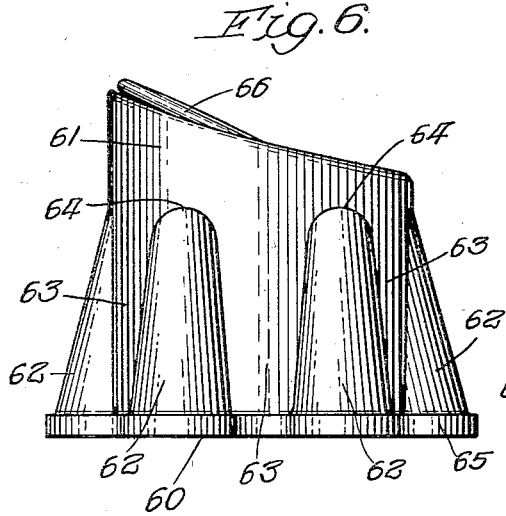
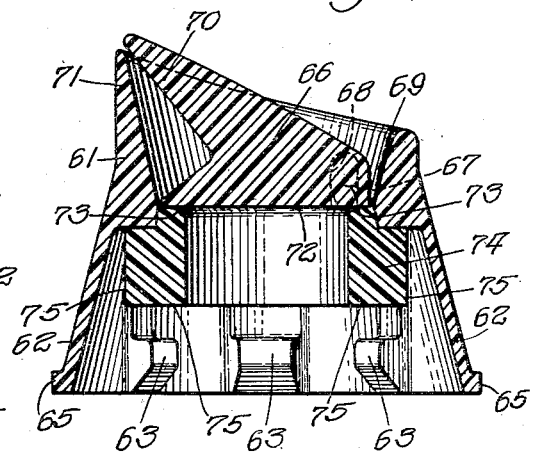
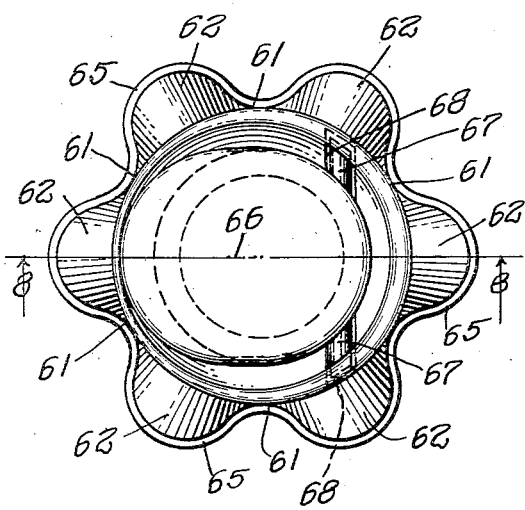
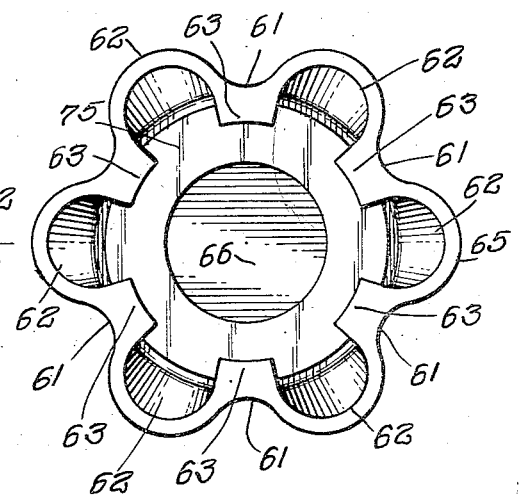
Inventor
Walter E. Bladh,
By Merriam & Lorch,
Attys.

United States Patent Office 2,821,319
Patented Jan. 28, 1958

2,821,319

NOVELTY BOTTLE CAP

Walter E. Bladh, Chicago, Ill.

Application May 16, 1955, Serial No. 508,420

6 Claims. (Cl. 215—41)

This invention relates to bottle caps and more particularly to a cap which is adapted to fit standard types of milk bottle finishes and which is substantially self-sealing. This application is a continuation-in-part of my copending application Serial No. 446,524, filed July 29, 1954.

Up to now, caps for milk bottles have had to be constructed to conform to each particular variety of milk bottle finish, and have been relatively complex and cumbersome. Also, their pouring surfaces have been accessible to flies and the like.

I have devised a cap and spout which will fit a wide variety of standard milk bottle finishes of various iszes, viz., such as have been adopted as standard by the Glass Container Manufacturing Institute. My cap is provided with a bottle-lip gripping base, a spout of simple construction associated with the body and a closure for covering the spout to protect its pouring surfaces against flies and to simultaneously seal off the bottle mouth thereby protecting the contents from refrigerator odors. The closure can be easily removed from the spout for cleansing. The simplicity of the structure renders it economical to manufacture.

Referring now to the drawings:

Figure 1 is a side elevation of a cap and spout according to the present invention;

Figure 2 is a top plan view of the cap and spout shown in Figure 1;

Figure 3 is a bottom plan view of the cap of Figure 1;

Figure 4 is a vertical sectional view of the cap of Figure 1 secured to a standard type of milk bottle finish, taken along the line 4—4 of Figure 2;

Figure 5 is a view according to Figure 4 showing the cap, spout and closure in pouring position;

Figure 6 is a side elevation of a modified cap having unitary spout and bottle-lip gripping base;

Figure 7 is a plane view of the cap of Figure 6;

Figure 8 is a vertical sectional view of the cap of Figure 6 taken at 8—8 of Figure 7; and Figure 9 is a bottom plan view of the cap of Figure 6.

As seen in Figure 1, my cap comprises a bottle-lip gripping base or body 12, a spout element 14 integrally formed therewith and adapted to fit coaxially in abutting relationship with the lip or the rim of a milk bottle 15, and a unitary cover or closure 16.

Referring to Figures 1, 3 and 4, the base 12 is formed of a flexible material such as polyethylene, and is provided with corrugations 18, grooved internally, to permit the circumference of the base to expand and contract during removal or fitting of the cap 10. The corrugations 18 taper upwardly to buttress the spout 14, and the inset portions or grooves 20 between corrugations 18 preferably terminate below the lower rim 22 of the spout 14 to reduce resistance to bending between the spout and the base. Also, the corrugations 18 may be cut away, as shown in Figure 4 at 24 to further reduce bending resistance.

Referring to Figures 3 and 4, a plurality of clamping lugs 25 is formed in spaced apart relationship around the inner circumference of the base 12, and in offset relationship to the corrugations 18. The lugs 25 may be formed in any desired configuration to fit any given type of bottle finish and preferably are shaped to fit all standard bottles. Also the lugs may be varied as among themselves so that a plurality of lugs adapted to fit one type of bottle finish may be disposed in appropriate positions around the base 12, while a plurality of lugs adapted to fit a second type of bottle finish may be spaced intermediately of the first set of lugs. The same cap may thus be suitable for several varieties of bottle finishes, the number of finishes for which each cap is suitable being limited only by the size of the cap and of the lugs.

Thus, in Figure 3, lugs 26, 28 and 30 might be adapted to fit one type of bottle finish; lugs 32, 34 and 36 another; lugs 38, 40 and 42 a third; and lugs 44, 46 and 48 a fourth type. Alternatively, one shape can be used for the lugs which will serve to provide a relatively secure fit when used with any standard size or shape of milk bottle finish.

Referring now to Figures 1, 2 and 4, the spout 14 is preferably beveled internally to provide a suitable pouring surface. An annular flange 50 is formed integrally therewith around the lower inner rim to provide the aforementioned abutment for the bottle rim.

The unitary closure 16 is adapted to engage the upper surface of the flange 50 in sealing relationship thereto, and is pivotally secured to the spout 14 by means of hinge pins 52 formed integrally in the thickened rear portion 54 of the spout. The pins are journaled in slots 56 formed in the spout 14. The slots 56 provide for lost motion so that, as seen in Figure 5, when the bottle is tilted downwardly the pins 52 can travel along the slots to permit free and complete opening of the closure element 16. Such movement also permits air to enter the bottle in back of closure part 54 when the bottle is tipped for pouring and thereby allows fluids to come out in a continuous stream without gurgling. The closure element swings open as the bottle is tipped. Opening does not depend on fluid pressure against the bottom of the closure element.

A protective cover portion 58 is formed integrally with the closure 16 and extends upwardly at an angle thereto, as seen in Figures 4 and 5, so that closure 16 may be opened readily. The cover is adapted to protect the pouring surface of the spout 14, and a clearance of only approximately one sixteenth of an inch is provided between its rim 60 and the pouring surface of the spout 14 when closure 16 is in closed position to prevent insects from entering the interior of the spout while providing sufficient ventilation so that unhygienic conditions cannot develop along the pouring surfaces.

The closure 16 may be formed of any of a number of materials, although styrene has been found to be suitably light and economical. As seen in Figure 5, the use of a sufficiently light closure insures that there will be no interference with the pouring operation.

Another embodiment of the invention is disclosed in Figure 6. The cap of this figure is designed for fitting the widest variety of bottles and provides for extended circumferential expansion, even with materials that are not overly flexible, by enlarged corrugations of greater length than those of the cap of Figure 1.

The cap of Figure 6 has base element 60 unitarily and integrally combined with spout part 61. The base is substantially annular but contains corrugations 62 and alternate corrugations 61 united so as to give a serpentine appearance. The outwardly projecting corrugations 62 are hollow in back and therefore readily bendable. The outwardly projecting corrugations 62 taper upwardly and terminate at 64. Reinforcing ring 65 may be extended around the base portion to reinforce it and prevent tearing the resilient material used in the cap.

As shown in Figures 7 and 8 the closure 66 has a pin 67 which projects from the closure on two sides and the ends of the pin fit into apertures 68 to allow pivotable movement of the closure with respect to the spout. The aperture 68 is extended vertically to permit slidable movement of the pin when the cap is tipped so that air may enter the bottle over the back of the closure at 69. Closure 66 has overhang 70 which fits in close proximity to pouring edge 71 of the spout to keep out flies and air borne contaminants. The bottom 72 of the closure is essentially flat and adapted to contact uniformly bearing surface 73 to provide a continuous seal. Ring 74 is provided internally of the cap and may be a separate piece or formed as a unitary part of the cap. When formed as one piece, vertical edge 75 should be free and not bound to the corrugations so that greater flexibility of the base may be attained. Bottom surface 75 is substantially smooth and adapted to form intimate contact with the upper surface of a bottle mouth while permitting passage of fluids from the bottle through the ring and out the spout.

The inwardly projecting corrugations 61 have lugs 63 extending inwardly therefrom shaped to resiliently grip the lip of a bottle and hold the bottle mouth in firm contact with surface 75. The top and bottom edges of the lugs are rounded or tapered to facilitate placing the cap in position and aiding its removal.

I have thus provided a cap and spout which is both simple and economical to manufacture and which can be easily fitted on any of a number of standard bottle finishes. The closure can be opened or seated against the flange of the spout very simply by tilting the bottle, and substantially all surfaces are accessible for washing.

The above detailed description has been given for clearness of understanding only. No unnecessary limitations should be understood therefrom, as modifications will be obvious to those skilled in the art.

What is claimed is:

1. A milk bottle cap comprising an internally hollow unitary annular body of flexible material with longitudinal corrugations at the bottom and a spout at the top, the corrugations and spout being integrally formed, a horizontal flange positioned inside the body between the spout and bottom of the corrugations, internal lugs on the corrugations below the flange, and a unitary closure member secured pivotally inside the spout to removably seal the spout.

2. The cap of claim 1 in which the lugs are on the corrugation ridges when viewed from inside the body.

3. The cap of claim 1 in which the bottom of the flange is adapted to abut the rim of a milk bottle and the top of the flange provides a seat for the closure member.

4. The cap of claim 3 in which the closure member is pivotally mounted to swing by gravity.

5. The cap of claim 3 in which the closure member has a bottom surface adapted to contact the upper surface of the flange and a cover portion substantially complementary to the spout which covers the pouring surfaces when the closure is seated.

6. The cap of claim 4 in which the closure member is pivotally supported by a pair of pins formed on said closure and journaled in a pair of slots formed in said spout, said slots being elongated vertically whereby said closure both swings and moves rectilinearly.

References Cited in the file of this patent
UNITED STATES PATENTS

| | | |
|---|---|---|
| 1,158,622 | Blakeslee | Nov. 2, 1915 |
| 2,111,186 | Jenks | Mar. 15, 1938 |
| 2,203,133 | Englert | June 4, 1940 |
| 2,669,369 | Towns | Feb. 16, 1954 |